United States Patent
Wu et al.

(10) Patent No.: US 11,483,767 B2
(45) Date of Patent: Oct. 25, 2022

(54) CROSS-SLOT SCHEDULING FOR POWER SAVING IN MOBILE COMMUNICATIONS

(71) Applicant: MediaTek Inc., Hsinchu (TW)

(72) Inventors: Wei-De Wu, Hsinchu (TW); Cheng-Hsun Li, Hsinchu (TW)

(73) Assignee: MediaTek Inc. (TW)

( * ) Notice: Subject to any disclaimer, the term of this patent is extended or adjusted under 35 U.S.C. 154(b) by 26 days.

(21) Appl. No.: 16/790,690

(22) Filed: Feb. 13, 2020

(65) Prior Publication Data

US 2020/0267643 A1 Aug. 20, 2020

Related U.S. Application Data

(60) Provisional application No. 62/842,676, filed on May 3, 2019, provisional application No. 62/806,500, filed on Feb. 15, 2019.

(51) Int. Cl.
*H04W 52/02* (2009.01)
*H04L 5/00* (2006.01)
*H04W 72/04* (2009.01)

(52) U.S. Cl.
CPC ....... *H04W 52/0209* (2013.01); *H04L 5/0048* (2013.01); *H04W 72/042* (2013.01)

(58) Field of Classification Search
CPC ... H04L 5/0048; H04L 5/0051; H04L 5/0053; H04L 5/0092; H04W 52/0209; H04W 72/042; Y02D 30/70
See application file for complete search history.

(56) References Cited

U.S. PATENT DOCUMENTS

2018/0270799 A1\* 9/2018 Noh ................. H04L 1/1812
2019/0082431 A1\* 3/2019 Yl .................... H04L 5/0057
(Continued)

FOREIGN PATENT DOCUMENTS

CN 104904257 A 9/2015
CN 110366261 A \* 10/2019 .......... H04W 72/042
(Continued)

OTHER PUBLICATIONS

Kim et al., "Scheduling Profile for UE Power Savings", Mar. 12, 2018, Apple Inc., U.S. Appl. No. 62/641,564, Total pp. 51 (Year: 2018).\*

(Continued)

*Primary Examiner* — Shah M Rahman
(74) *Attorney, Agent, or Firm* — Han IP PLLC; Andy M. Han (57) ABSTRACT

Various solutions with respect to cross-slot scheduling for power saving in mobile communications are described. An apparatus receives, from a wireless network, a control signaling. According to the control signaling, the apparatus changes an aspect of a power profile of at least one bandwidth part (BWP) of a plurality of BWPs without causing data interruption regarding data transmission or reception by the apparatus. The apparatus also receives, from the wireless network, an indication. According to the indication, the apparatus adapts a new minimum applicable value of at least one of a downlink scheduling offset (K0), an uplink scheduling offset (K2), and an aperiodic channel state information reference signal (CSI-RS) triggering offset for an active DL BWP or an active UL BWP of the plurality of BWPs.

14 Claims, 4 Drawing Sheets

(56) References Cited

U.S. PATENT DOCUMENTS

| | | | |
|---|---|---|---|
| 2019/0090299 A1* | 3/2019 | Ang .................. | H04L 5/003 |
| 2019/0215847 A1* | 7/2019 | Abdoli ............. | H04W 72/1263 |
| 2019/0261405 A1* | 8/2019 | Ang .................. | H04W 72/0453 |
| 2019/0281545 A1* | 9/2019 | Kim .................. | H04W 52/0216 |
| 2020/0053755 A1* | 2/2020 | Ang .................. | H04L 5/0044 |
| 2020/0107345 A1* | 4/2020 | Ang .................. | H04L 25/0226 |
| 2020/0229081 A1* | 7/2020 | Ang .................. | H04B 7/0626 |
| 2020/0236692 A1* | 7/2020 | Lin ................... | H04W 72/042 |
| 2021/0051667 A1* | 2/2021 | Yang ................. | H04L 5/0098 |
| 2021/0058964 A1* | 2/2021 | Hooli ................ | H04W 72/0453 |
| 2021/0136806 A1* | 5/2021 | Xiong ............... | H04W 72/1289 |
| 2021/0136808 A1* | 5/2021 | Yang ................. | H04L 5/0053 |
| 2021/0307031 A1* | 9/2021 | Chen ................. | H04L 5/001 |
| 2021/0360674 A1* | 11/2021 | Lim ................... | H04L 5/0053 |

FOREIGN PATENT DOCUMENTS

| | | | |
|---|---|---|---|
| WO | WO 2018030803 A1 | 2/2018 | |
| WO | WO 2019029536 A1 | 2/2019 | |
| WO | WO-2020091520 A1 * | 5/2020 | ............ H04W 72/04 |

OTHER PUBLICATIONS

Ang et al., "Cross-Carrier Scheduling Enhancements in New Radio (NR)", Aug. 10, 2018, QUALCOMM Incorporated, U.S. Appl. No. 62/717,596, Total pp. 96 (Year: 2018).*

Catt, "Summary of UE Power Saving Signal/Chanel triggered", 3GPP TSG RAN WG1 Ad-Hoc Meeting 1901, R1-1901363, Taipei, Taiwan, Jan. 21-25, 2019, Total pp. 6 (Year: 2019).*

China National Intellectual Property Administration, International Search Report and Written Opinion for PCT/CN2020/075333, dated May 19, 2020.

Ericsson, Triggers of NR UE power saving, 3GPP TSG-RAN WG1 Meeting #95, R1-1813183, Spokane, USA, Nov. 12-16, 2018.

Taiwan Intellectual Property Office, Office Action for Taiwan Patent Application No. 109104759, dated Jun. 30, 2022.

* cited by examiner

CROSS-SLOT SCHEDULING FOR POWER SAVING IN MOBILE COMMUNICATIONS

CROSS REFERENCE TO RELATED PATENT APPLICATION(S)

The present disclosure is part of a non-provisional application claiming the priority benefit of U.S. Patent Application No. 62/806,500, filed on 15 Feb. 2019, and U.S. Patent Application No. 62/842,676, filed on 3 May 2019. Contents of aforementioned applications are incorporated by reference in their entirety.

TECHNICAL FIELD

The present disclosure is generally related to mobile communications and, more particularly, to cross-slot scheduling for power saving in mobile communications.

BACKGROUND

Unless otherwise indicated herein, approaches described in this section are not prior art to the claims listed below and are not admitted as prior art by inclusion in this section.

In New Radio (NR), a user equipment (UE) is generally in either a wake-up mode or a power-saving or low-power mode. While in the wake-up mode, the UE typically monitors for control information, receives downlink (DL) data, and transmits uplink (UL) data, for example. It is possible that the UE can consume a significant portion of total power consumption on monitoring the physical downlink control channel (PDCCH). As UEs are typically mobile and hence operate on portable power supplies (e.g., a battery), it is imperative that the UE can minimize power consumption so as to prolong the time during which operation of the UE is sustained by its portable power supply.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to cross-slot scheduling for power saving in mobile communications.

In one aspect, a method may involve an apparatus (implemented in a UE) receiving, from a wireless network, a control signaling. The method may also involve the apparatus changing, according to the control signaling, an aspect of a power profile of at least one bandwidth part (BWP) of a plurality of BWPs without causing data interruption regarding data transmission or reception by the UE.

In another aspect, a method may involve an apparatus (implemented in a UE) receiving, from a wireless network, an indication. The method may also involve the apparatus adapting, according to the indication, a new minimum applicable value of at least one of a DL scheduling offset, an UL scheduling offset, and an aperiodic channel state information reference signal (CSI-RS) triggering offset for an active DL BWP or an active UL BWP of a plurality of BWPs.

It is noteworthy that, although description provided herein may be in the context of certain radio access technologies, networks and network topologies such as 5th Generation (5G) and NR, the proposed concepts, schemes and any variation(s)/derivative(s) thereof may be implemented in, for and by other types of radio access technologies, networks and network topologies such as, for example, Long-Term Evolution (LTE), LTE-Advanced, LTE-Advanced Pro, Internet-of-Things (IoT), Narrow Band Internet of Things (NB-IoT) and any other technologies developed in the future. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cross-slot scheduling for power saving in mobile communications. According to the present disclosure, a number of possible solutions may be implemented separately or jointly. That is, although these possible solutions may be described below separately, two or more of these possible solutions may be implemented in one combination or another.

Figure 1:
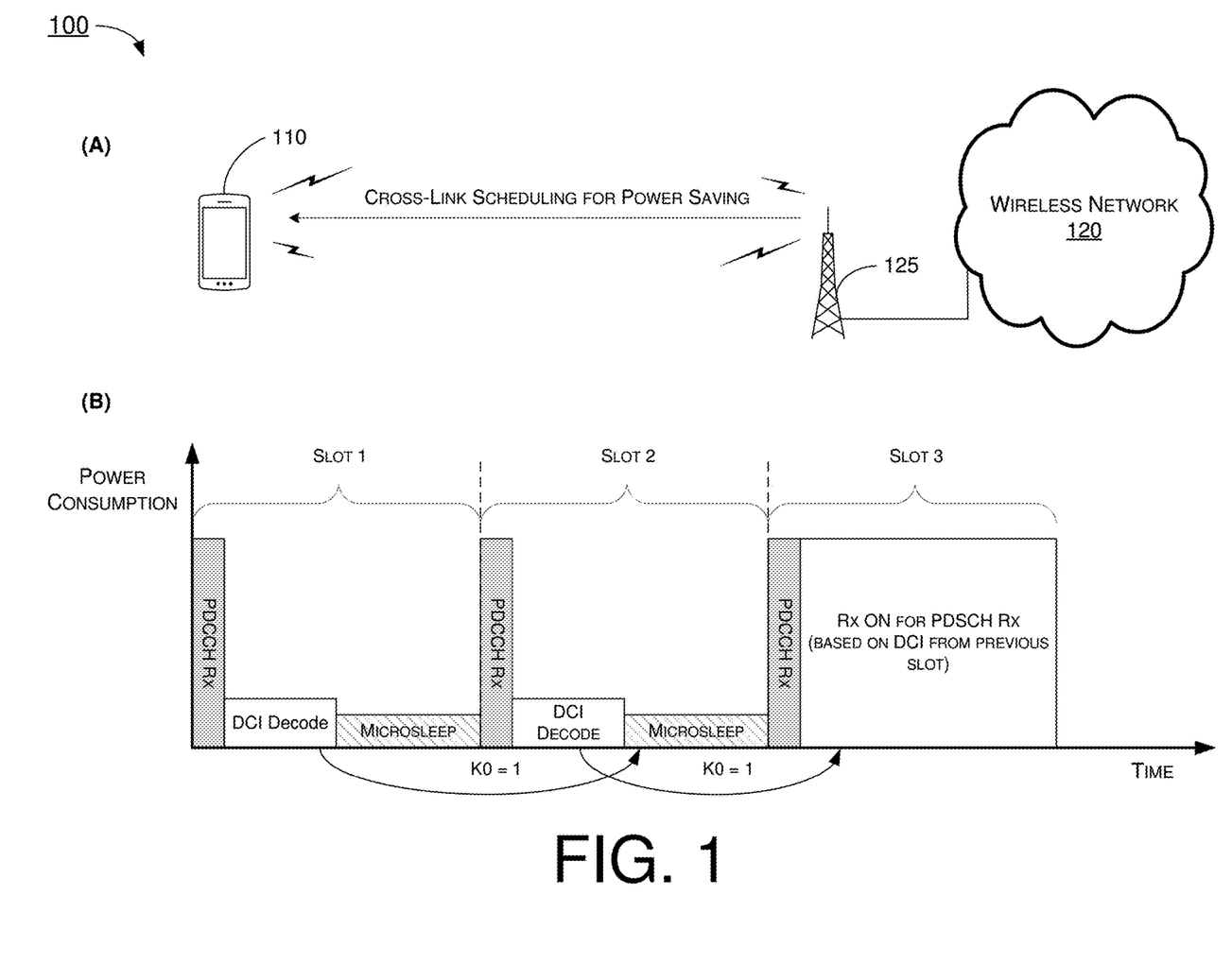
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to part (A) of FIG. 1, network environment 100 may be an NR communication environment involving a UE 110 and a wireless network 120 (e.g., NR mobile network). UE 110 may be implemented in the form of, for example and without limitation, a portable apparatus (e.g., smartphone), a wearable device (e.g., smartwatch), a vehicle or a component thereof, a roadside unit (RSU) (e.g., a traffic signal, a streetlamp, a roadside sensor or a roadside structure) or an Internet of Thing (IoT) device (e.g., a sensor). Wireless network 120 may be in wireless communication with UE 110 via a network node 125 (e.g., an eNB, gNB or transmit/receive point (TRP)). In network environment 100, UE 110 and wireless network 120 (via network node 125) may implement various schemes pertaining to cross-slot scheduling for power saving in mobile communications (e.g., NR mobile communications) in accordance with the present disclosure, as described below.

In NR mobile communications, due to cross-slot scheduling, the presence of a physical downlink shared channel (PDSCH) is known by UE 110 based on information received in a previous time slot. In case there is no PDSCH in a current slot, UE 110 can receive PDCCH symbols and save power for the current slot as there is no data to be received. In NR, cross-slot scheduling is determined by the minimum K0/K2 entry of a time-domain resource allocation (TDRA) table in an active DL/UL bandwidth part (BWP), with K0 being a parameter of scheduling offset for PDSCH and K2 being a parameter of scheduling offset for physical uplink shared channel (PUSCH). For instance, when K0=0, downlink data, if any, is expected to be received in the same slot, when K0=1, downlink data scheduled in the given slot will not be received until one slot later and, when K0=2, downlink data scheduled in the given slot will not be received until two slots later.

In Release 15 (Rel-15) of the 3$^{rd}$ Generation Partnership Project (3GPP) specification for NR, adaptation to cross-slot scheduling is realized by BWP switching. In Release 16 (Rel-16) of the 3GPP specification for NR, within an active DL/UL BWP, up to two minimum schedule offsets (minimumScheduleOffset's) can be configured. Under various proposed schemes in accordance with the present disclosure, a new adaptation by downlink control information (DCI) indication is introduced to select and/or apply an indicated minimumScheduleOffset for active DL and UL BWPs. The new adaptation may provide some benefits, including the following: faster adaptation than BWP switching, no data interruption during adaptation, and joint indication for DL and UL adaptations.

Referring to the timing diagram shown in part (B) of FIG. 1, UE 110 may perform different activities in each slot and, accordingly, the power consumption by UE 110 varies correspondingly. In slot 1, UE 110 may receive control information (e.g., downlink control information (DCI)) on a PDCCH (denoted as "PDCCH Rx" in FIG. 1) and then decode the DCI, followed by a discontinuous reception (DRX) off-duration for microsleep to conserve power. Upon decoding the DCI, cross-slot scheduling allows UE 110 to be aware of what to expect to receive in slot 2. In the example shown in FIG. 1, cross-slot scheduling indicates to UE 110 that there is no data reception expected for slot 2. In slot 2, UE 110 may receive control information (e.g., DCI) on a PDCCH (denoted as "PDCCH Rx" in FIG. 1) and then decode the DCI, followed by microsleep to conserve power. Upon decoding the DCI, cross-slot scheduling allows UE 110 to be aware of what to expect to receive in slot 3. In the example shown in FIG. 1, cross-slot scheduling indicates to UE 110 that there is data reception expected for slot 3. In slot 3, UE 110 may receive control information (e.g., DCI) on a PDCCH (denoted as "PDCCH Rx" in FIG. 1) and then receive data on a PDSCH.

In accordance with the present disclosure, a number of schemes may be implemented to achieve significant power saving gain with limited latency increment or system impact. For instance, a DCI-based BWP switching and BWP time-out with a 20 MHz default BWP may be implemented. Additionally, wake-up signaling may be aggregated with periodic and/or background activities around a synchronization signal (SS) burst. Moreover, PDCCH monitoring period after a specified time of data inactivity may be adapted. Furthermore, for voice over Internet Protocol (VoIP), a 20 MHz BWP of up to two multiple-input-multiple-output (MIMO) layers may be applied constantly, and a PDCCH monitoring period of four or eight slots may provide an optimum balance in power saving gain and latency increment.

Under a proposed scheme in accordance with the present disclosure, BWP-based adaptation may be one way to realize joint power saving adaptation. Optimized adaptation per service may also be realized by optimizing one BWP setting for a targeted service. However, data interruption and the BWP switching delay (e.g., 2~3 ms) may cause data rate loss in case that BWP switching is applied during a data burst.

Accordingly, under the proposed scheme, one enhancement to BWP-based adaptation may be to introduce a power profile-based switching with no data interruption and with a short switching delay. Under the proposed scheme, a power profile may be defined on top of a BWP configuration. The power profile may specify a set of selections and restrictions on the BWP parameters such that change in the values of the BWP parameters would not cause data interruption. BWP parameters in a given power profile in accordance with the proposed scheme may include, for example and without limitation, search space selection, PDCCH monitoring period selection, restriction on values of K0, K2 and aperiodic channel state information reference signal (CSI-RS) triggering offset. Moreover, under the proposed scheme, multiple power profiles in a given BWP may be defined to enable fast adaptation of PDCCH monitoring period without data interruption.

Compared with having multiple BWPs defined with reduced number of different parameters, the usage of power profiles in each BWP may prevent duplication of parameters and may exploit compact configuration of a small BWP number. In short, under the proposed scheme, a power profile for a BWP may include a set of selections and restrictions on BWP parameters that do not cause data interruption if values thereof are changed. Power profiles may be utilized to realize efficient power saving adaptation for NR mobile communications. Thus, within a given BWP, different slots may have different values for K0 and/or K2 and the minimum value of K0 and/or K2 may be changed without causing data interruption. Thus, under the proposed scheme, for an active DL and/or an active UL BWP the value of one or more BWP parameters of a power profile for a BWP may be changed without causing data interruption after UE 110 is indicated by wireless network 120 to change the minimum applicable value(s) of K0 and/or K2 before the change indicated takes effect (e.g., in a subsequent slot). It is noteworthy that UE 110 may be scheduled data with restriction based on current active minimum applicable value(s) of K0 and/or K2.

With respect to adaptation of cross-slot and same-slot scheduling, the minimum applicable values of K0, K2 and/or aperiodic CSI reference signal (CSI-RS) triggering offset may be adapted. One objective is to avoid the complication of a scheduling UE (e.g., UE 110) of different scheduling offsets K0 and K2. One way may be to call back UE 110 to same-slot scheduling whenever there is data intended for UE 110. Since the functionality can be included in the design of PDCCH-based power-saving signal/channel, a Layer 1 (L1)-based signaling may be preferred in order to present a duplicated design with a medium access control (MAC) control element (CE).

Under a proposed scheme in accordance with the present disclosure, for an active DL BWP and/or an active UL BWP, network node 125 of wireless network 120 may indicate to UE 110, via L1-based signaling(s) (e.g., DCI), to adapt the minimum applicable value(s) of K0, K2 and/or aperiodic CSI-RS triggering offset with or without quasi-colocation (QCL) type D (QCL_typeD), or spatial reception parameter(s), configured. Moreover, under the proposed scheme, a joint indication to a common index may be supported to minimize the overall signaling overhead due to the adaptation of cross-slot and/or same-slot scheduling. In some implementations, the common index may indicate or otherwise correspond to a targeted set of minimum applicable values of two or more of K0, K2 and aperiodic CSI-RS triggering offset. In other implementations, the common index may indicate or otherwise correspond to a first set of minimum applicable values of K0, a second set of minimum applicable values of K2, and/or a third set of minimum applicable values of aperiodic CSI-RS triggering offset. For instance, a one-bit indication may be utilized to jointly indicate to UE 110 a common index corresponding to the minimum applicable K0 value for the active DL BWP and the minimum applicable K2 value for the active UL BWP, which are to be applied at least after an application delay. The one-bit indication may be in DCI format 1_1 or format 0_1.

With respect to maximizing gain in UE power saving, under a proposed scheme in accordance with the present disclosure, UE 110 may be indicated cross-slot scheduling when there is no data intended for UE 110 or when UE data is insensitive to the cross-slot scheduling delay. Two different cases are considered.

In the case of "outside active time," PDCCH-based power saving signal/channel design may be used to cancel the PDCCH monitoring for an upcoming DRX on-duration in case that there is no data activity or to apply cross-slot scheduling to a suitable traffic type per the respective data activity. Accordingly, UE 110 may monitor UE-specific and/or group-specific power-saving PDCCH for the indication. It may be up to wireless network 120 to select proper type of power-saving PDCCH in order to minimize the resource overhead.

In the case of "during active time with PDCCH monitoring," UE 110 may monitor PDCH during the DRX on-duration. When there is no data activity, it may be beneficial to allow UE 110 to exploit the power saving gain from cross-slot scheduling. To realize the power saving gain, UE 110 may keep monitoring power saving indication during active time with PDCCH monitoring. Since data inactivity timing is UE-specific and generally not aligned, group-based signaling may not be efficient. On the other hand, monitoring a dedicated UE-specific power-saving DCI during active time may exceed the DCI format size budget. Thus, it may be necessary to add one or more additional bits in existing UE-specific scheduling DCI for the indication.

Accordingly, under a proposed scheme in accordance with the present disclosure, additional indication bit(s) may be configured in scheduling DCI, to be transmitted from network node 125 to UE 110, for adaptation of cross-slot and/or same-slot scheduling. Under the proposed scheme, one additional bit may be used for a common index (shared for some or all of K0, K2 and aperiodic CSI-RS triggering offset) corresponding to two sets of minimum applicable values for each of K0 and K2, each of K0 and aperiodic CSI-RS triggering offset, each of K2 and aperiodic CSI-RS triggering offset, or each of K0, K2 and aperiodic CSI-RS triggering offset. For instance, scheduling DCI format(s) (e.g., format 1_1 and/or format 0_1) may be utilized to indicate to UE 110 a common index corresponding to the minimum applicable values of K0 and/or K2 for active DL and/or UL BWP during active time (e.g., during a DRX on-duration). It is noteworthy that, in case that it is desired to always apply same-slot data scheduling, the indication may be used to schedule a dummy data that occupies the minimal resource and may be shared across multiple users for the minimized overhead.

With respect to switching delay for a physical layer adaptation, given a switching delay or application delay of X slot(s) after a DCI indication received at slot n, UE 110 would not expect DL or UL data scheduled before slot n+X, and new physical layer setting may be applied starting in slot n+X. For reference, time components for a physical layer setting change may include a first time component for control information monitoring (from PDCCH symbol reception to DCI parsing), a second time component for radio frequency (RF)/baseband (BB) parameter calculation and loading, and a third time component for applying new parameters. Under a proposed scheme in accordance with the present disclosure, a suggested requirement for the first time component may be the minimum of 480 µs and the slot duration, or min(480 µs, slot duration). For instance, for a 15 k sub-carrier spacing (SCS), total reception and processing time may be finished within six to seven symbols. When a slot duration is short, UE 110 may at least finish control information monitoring within the slot duration. Additionally, a suggested requirement for the second time component may be 10 µs. For instance, for baseband related parameters, the calculation may be fast, and 10 µs may be sufficient. Moreover, a suggested requirement for the third time component may be 0 µs. For instance, an example of the third time component may be related to baseband-only changes, and there may be little time requirement.

Accordingly, under a proposed scheme in accordance with the present disclosure, for L1-based switching on baseband-only parameters (e.g., the minimum applicable values of K0 and K2), when UE 110 receives a change request at slot n, UE 110 may be ready to receive PDSCH with new settings at slot n+X. For illustrative purposes and without limiting the scope of the present disclosure, example lower limits on X may follow Table 1 below. For instance, the minimum value of X, in terms of number of slots, may be one slot, one slot, two slots or two slots for SCS values of 15 kHz, 30 kHz, 60 kHz or 120 kHz, respectively.

TABLE 1

Lower Limits on Switching Delays in Terms of Number of Slots

| α (SCS = 15 kHz · $2^\alpha$) | NR Slot Length (ms) | Switching Delay X |
|---|---|---|
| 0 | 1 | >=1 |
| 1 | 0.5 | >=1 |

TABLE 1-continued

Lower Limits on Switching Delays in Terms of Number of Slots

| α (SCS = 15 kHz · $2^α$) | NR Slot Length (ms) | Switching Delay X |
|---|---|---|
| 2 | 0.25 | >=2 |
| 3 | 0.125 | >=2 |

For instance, for PDCCH monitoring for cross-carrier scheduling, the application delay of cross-slot scheduling adaptation may be determined by X=max(Y, Z). Here, Z may be determined by the SCS of the active DL BWP of the scheduling cell and may indicate one slot, one slot, two slots or two slots for DL SCS of 15 kHz, 30 kHz, 60 kHz or 120 kHz, respectively. Moreover, Y may be determined as ceiling($minK_{0,scheduled} * 2^{\mu_{scheudling}} / 2^{\mu_{scheudled}}$). Here, $minK_{0,scheduled}$ denotes the minimum applicable K0 value of the active DL BWP of the scheduled cell prior to the change indication for the scheduled cell. Additionally, $\mu_{scheudling}$ and $\mu_{scheudled}$ denote the SCS indices for the scheduling cell and the scheduled cell, respectively.

Illustrative Implementations

Figure 2:
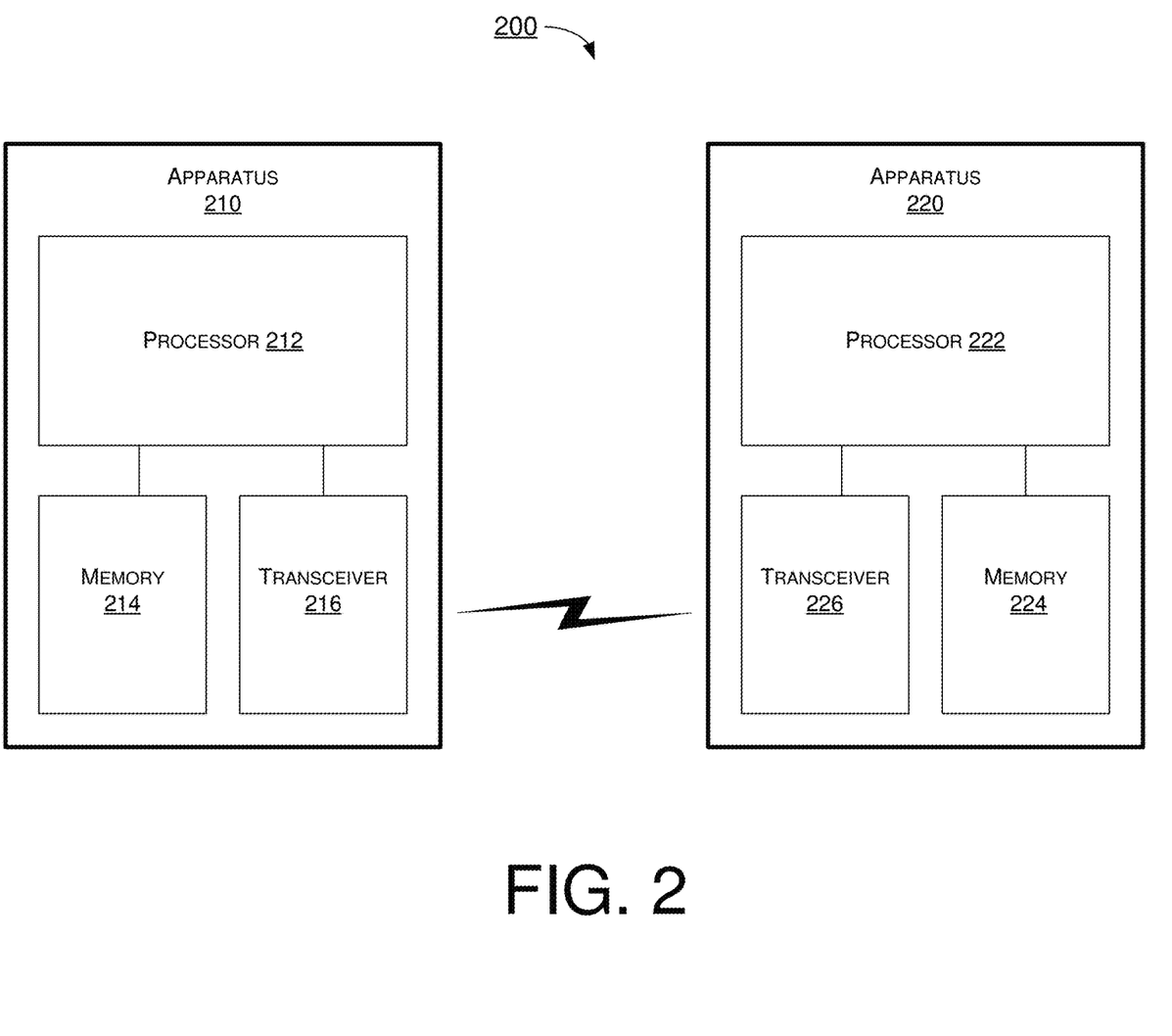
FIG. 2 is a block diagram of an example communication system in accordance with an implementation of the present disclosure.

FIG. 2 illustrates an example communication system 200 involving an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to cross-slot scheduling for power saving in mobile communications in accordance with the present disclosure, including scenarios/schemes described above as well as processes described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node (e.g., first network node 122) of a communication network (e.g., wireless network 120).

In one aspect of cross-slot scheduling for power saving in mobile communications under a proposed scheme in accordance with the present disclosure, processor 212 of apparatus 210 may receive, via transceiver 216, from a wireless network (e.g., wireless network 120) via apparatus 220 (e.g., as network node 125) a control signaling. Additionally, processor 212 may change, according to the control signaling, an aspect of a power profile of at least one BWP of a plurality of BWPs without causing data interruption regarding data transmission or reception by apparatus 210.

In some implementations, the power profile may include a set of one or more selections and one or more restrictions on BWP parameters. In such cases, in changing the aspect of the power profile, processor 212 may change a value of a selection or a restriction of the set of one or more selections and one or more restrictions.

In some implementations, the set of one or more selections and one or more restrictions may include a search space selection, a PDCCH monitoring period selection, a restriction on a respective value of at least one of a DL scheduling offset (K0), an UL scheduling offset (K2), and an aperiodic CSI-RS triggering offset.

In some implementations, apparatus 210 may be scheduled to receive or transmit data with a restriction based on a currently active minimum applicable value of either or both of the K0 and K2. In such cases, in changing the aspect of the power profile, processor 212 may cause a change, for an active DL BWP or an active UL BWP, a respective minimum applicable value of either or both of the K0 and the K2 before the change is in effect in a subsequent slot.

In some implementations, processor 212 may perform additional operations. For instance, processor 212 may receive, via transceiver 216, from the wireless network via a network node (e.g., apparatus 220 as network node 125) an indication. Moreover, processor 212 may adapt, according to the indication, a new minimum applicable value of at least one of the K0, the K2, and the aperiodic CSI-RS triggering offset for an active DL BWP or an active UL BWP of the plurality of BWPs during a DRX on-duration.

In some implementations, in receiving the indication, processor 212 may receive a Layer 1 (L1)-based signaling including DCI.

In some implementations, in adapting according to the indication, processor 212 may adapt, according to an additional bit in the DCI, an index (e.g., a common index shared for some or all of K0, K2 and aperiodic CSI-RS triggering offset) corresponding to the new minimum applicable value of at least one of the K0, the K2, and the aperiodic CSI-RS triggering offset for both the active DL BWP and the active UL BWP of the plurality of BWPs.

In some implementations, processor 212 may perform other operations. For instance, processor 212 may receive, via transceiver 216, data on a PDSCH with the new minimum applicable value of at least one of the K0, the K2, and the aperiodic CSI-RS triggering offset in effect in a second slot. In such cases, the indication may be received in a first slot which is ahead of the second slot in time by at least a predetermined number of slots.

In some implementations, the predetermined number of slots may be determined based on an SCS value. For instance, the predetermined number of slots may be one slot, one slot, two slots or two slots corresponding to an SCS value of 15 kHz, 30 kHz, 60 kHz or 120 kHz, respectively.

In another aspect of cross-slot scheduling for power saving in mobile communications under a proposed scheme in accordance with the present disclosure, processor 212 of apparatus 210 may receive, via transceiver 216, from a wireless network (e.g., wireless network 120) via apparatus 220 (e.g., as network node 125) an indication. Moreover, processor 212 may adapt, according to the indication, a new minimum applicable value of at least one of K0, K2, and aperiodic CSI-RS triggering offset for an active DL BWP or an active UL BWP of a plurality of BWPs during a DRX on-duration.

In some implementations, in receiving the indication, processor 212 may receive a L1-based signaling including DCI.

In some implementations, in adapting according to the indication, processor 212 may adapt, according to an additional bit in the DCI, an index (e.g., a common index shared for some or all of K0, K2 and aperiodic CSI-RS triggering offset) corresponding to the new minimum applicable value of at least one of the K0, the K2, and the aperiodic CSI-RS triggering offset for both the active DL BWP and the active UL BWP of the plurality of BWPs.

In some implementations, processor 212 may perform additional operations. For instance, processor 212 may receive, via transceiver 216, data on a PDSCH with the new minimum applicable value of at least one of the K0, the K2, and the aperiodic CSI-RS triggering offset in effect in a second slot. In such cases, the indication may be received in a first slot which is ahead of the second slot in time by at least a predetermined number of slots.

In some implementations, the predetermined number of slots may be determined based on an SCS value. For instance, the predetermined number of slots may be one slot, one slot, two slots or two slots corresponding to an SCS value of 15 kHz, 30 kHz, 60 kHz or 120 kHz, respectively.

In some implementations, processor 212 may perform other operations. For instance, processor 212 may receive, via transceiver 216, from the wireless network via a network node (e.g., apparatus 220 as network node 125) a control signaling. Furthermore, processor 212 may change, according to the control signaling, an aspect of a power profile of at least one BWP of the plurality of BWPs without causing data interruption regarding data transmission or reception by apparatus 210. In such cases, the power profile may include a set of one or more selections and one or more restrictions on BWP parameters.

In some implementations, in changing the aspect of the power profile, processor 212 may change a value of a selection or a restriction of the set of one or more selections and one or more restrictions. In such cases, the set of one or more selections and one or more restrictions may include a search space selection, a PDCCH monitoring period selection, a restriction on a respective value of at least one of K0, K2, and aperiodic CSI-RS triggering offset.

In some implementations, apparatus 210 may be scheduled to receive or transmit data with a restriction based on a currently active minimum applicable value of either or both of the K0 and K2. In such cases, in changing the aspect of the power profile, processor 212 may cause a change, for an active DL BWP or an active UL BWP, a respective minimum applicable value of either or both of the K0 and the K2 before the change is in effect in a subsequent slot.

Illustrative Processes

Figure 3:
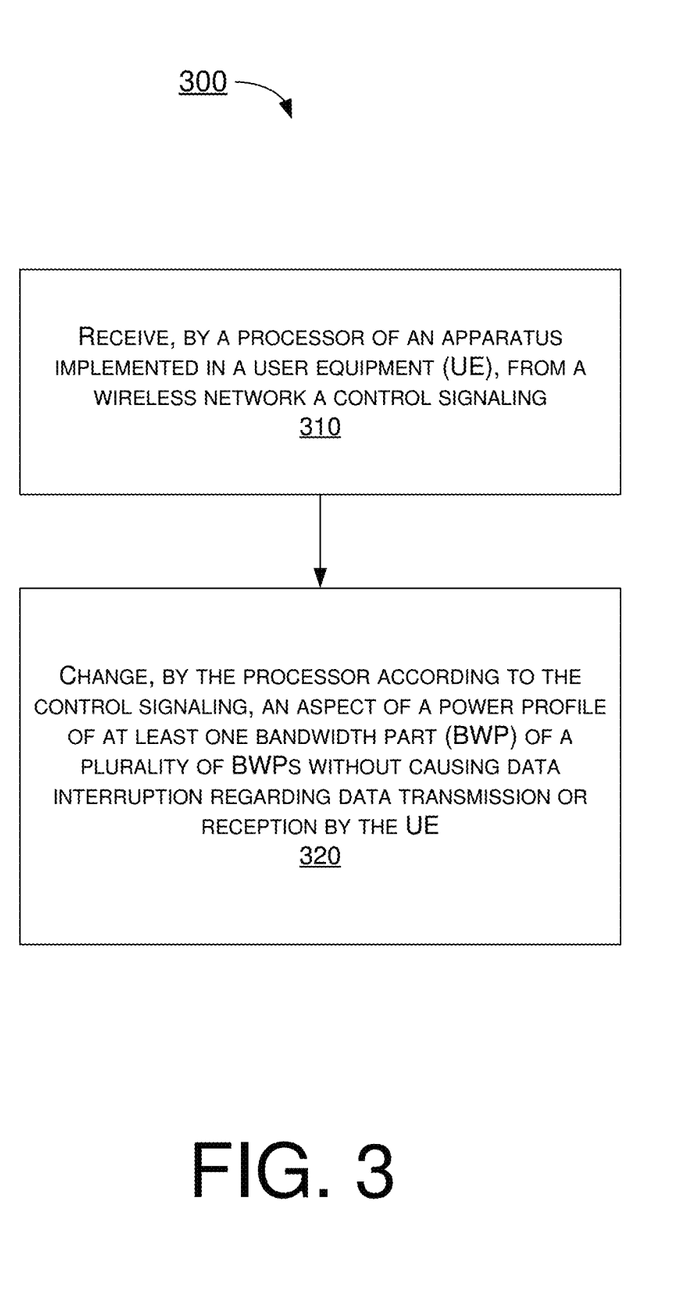
FIG. 3 is a flowchart of an example process in accordance with an implementation of the present disclosure.

FIG. 3 illustrates an example process 300 in accordance with an implementation of the present disclosure. Process 300 may be an example implementation of above scenarios/schemes, whether partially or completely, with respect to cross-slot scheduling for power saving in mobile communications in accordance with the present disclosure. Process 300 may represent an aspect of implementation of features of communication apparatus 210. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 receiving, via transceiver 216, from a wireless network (e.g., wireless network 120) via a network node (e.g., apparatus 220 as network node 125) a control signaling. Process 300 may proceed from 310 to 320.

At 320, process 300 may involve processor 212 changing, according to the control signaling, an aspect of a power profile of at least one BWP of a plurality of BWPs without causing data interruption regarding data transmission or reception by apparatus 210.

In some implementations, the power profile may include a set of one or more selections and one or more restrictions on BWP parameters. In such cases, in changing the aspect of the power profile, process 300 may involve processor 212 changing a value of a selection or a restriction of the set of one or more selections and one or more restrictions.

In some implementations, the set of one or more selections and one or more restrictions may include a search space selection, a PDCCH monitoring period selection, a restriction on a respective value of at least one of a DL scheduling offset (K0), an UL scheduling offset (K2), and an aperiodic CSI-RS triggering offset.

In some implementations, apparatus 210 may be scheduled to receive or transmit data with a restriction based on a currently active minimum applicable value of either or both of the K0 and K2. In such cases, in changing the aspect of the power profile, process 300 may involve processor 212 causing a change, for an active DL BWP or an active UL BWP, a respective minimum applicable value of either or both of the K0 and the K2 before the change is in effect in a subsequent slot.

In some implementations, process 300 may involve processor 212 performing additional operations. For instance, process 300 may involve processor 212 receiving, via transceiver 216, from the wireless network via a network node (e.g., apparatus 220 as network node 125) an indication. Moreover, process 300 may involve processor 212 adapting, according to the indication, a new minimum applicable value of at least one of the K0, the K2, and the aperiodic CSI-RS triggering offset for an active DL BWP or an active UL BWP of the plurality of BWPs during a DRX on-duration.

In some implementations, in receiving the indication, process 300 may involve processor 212 receiving a Layer 1 (L1)-based signaling including DCI.

In some implementations, in adapting according to the indication, process 300 may involve processor 212 adapting, according to an additional bit in the DCI, an index (e.g., a common index shared for some or all of K0, K2 and aperiodic CSI-RS triggering offset) corresponding to the new minimum applicable value of at least one of the K0, the K2, and the aperiodic CSI-RS triggering offset for both the active DL BWP and the active UL BWP of the plurality of BWPs.

In some implementations, process 300 may involve processor 212 performing additional operations. For instance, process 300 may involve processor 212 receiving, via transceiver 216, data on a PDSCH with the new minimum applicable value of at least one of the K0, the K2, and the aperiodic CSI-RS triggering offset in effect in a second slot. In such cases, the indication may be received in a first slot which is ahead of the second slot in time by at least a predetermined number of slots.

In some implementations, the predetermined number of slots may be determined based on an SCS value. For instance, the predetermined number of slots may be one slot, one slot, two slots or two slots corresponding to an SCS value of 15 kHz, 30 kHz, 60 kHz or 120 kHz, respectively.

Figure 4:
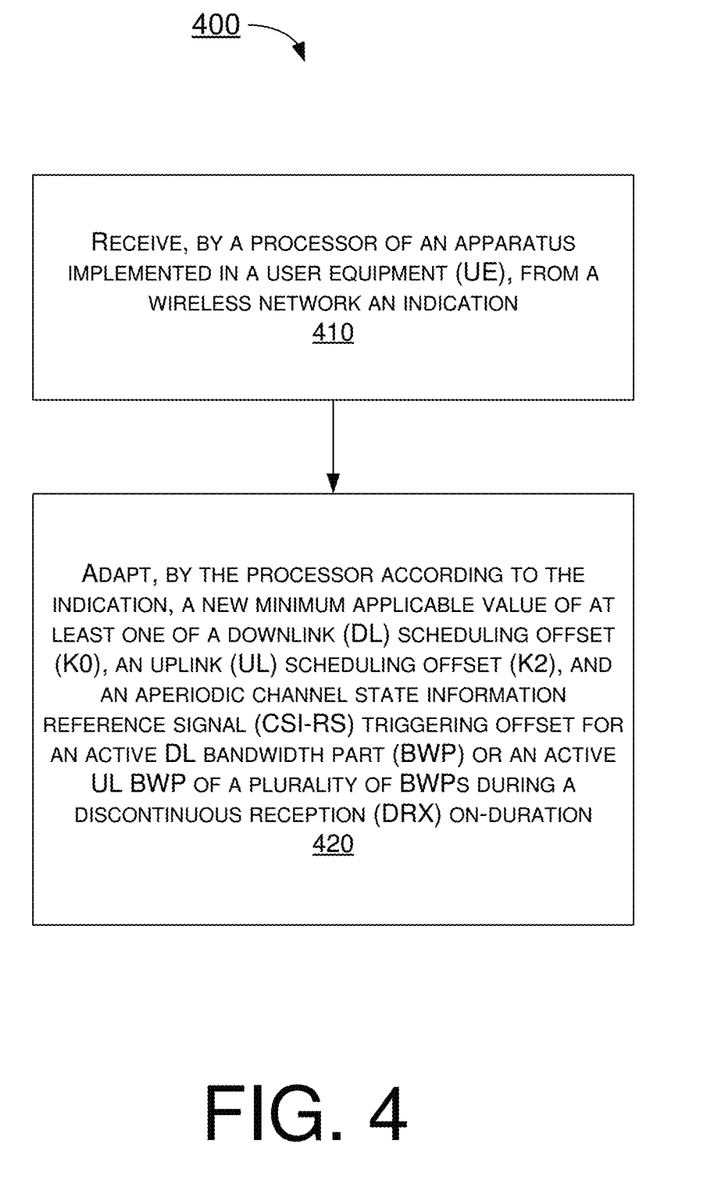
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to cross-slot scheduling for power saving in mobile communications in accordance with the present disclosure. Process 400 may represent an aspect of implementation of features of communication apparatus 210. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210. Process 400 may begin at block 410.

At 410, process 400 may involve processor 212 of apparatus 210 receiving, via transceiver 216, from a wireless network (e.g., wireless network 120) via a network node (e.g., apparatus 220 as network node 125) an indication. Process 400 may proceed from 410 to 420.

At 420, process 400 may involve processor 212 adapting, according to the indication, a new minimum applicable value of at least one of a DL scheduling offset (K0), an UL scheduling offset (K2), and an aperiodic CSI-RS triggering offset for an active DL BWP or an active UL BWP of a plurality of BWPs during a DRX on-duration.

In some implementations, in receiving the indication, process 400 may involve processor 212 receiving a L1-based signaling including DCI.

In some implementations, in adapting according to the indication, process 400 may involve processor 212 adapting, according to an additional bit in the DCI, an index (e.g., a common index shared for some or all of K0, K2 and aperiodic CSI-RS triggering offset) corresponding to the new minimum applicable value of at least one of the K0, the K2, and the aperiodic CSI-RS triggering offset for both the active DL BWP and the active UL BWP of the plurality of BWPs.

In some implementations, process 400 may involve processor 212 performing additional operations. For instance, process 400 may involve processor 212 receiving, via transceiver 216, data on a PDSCH with the new minimum applicable value of at least one of the K0, the K2, and the aperiodic CSI-RS triggering offset in effect in a second slot. In such cases, the indication may be received in a first slot which is ahead of the second slot in time by at least a predetermined number of slots.

In some implementations, the predetermined number of slots may be determined based on an SCS value. For instance, the predetermined number of slots may be one slot, one slot, two slots or two slots corresponding to an SCS value of 15 kHz, 30 kHz, 60 kHz or 120 kHz, respectively.

In some implementations, process 400 may involve processor 212 performing additional operations. For instance, process 400 may involve processor 212 receiving, via transceiver 216, from the wireless network via a network node (e.g., apparatus 220 as network node 125) a control signaling. Furthermore, process 400 may involve processor 212 changing, according to the control signaling, an aspect of a power profile of at least one BWP of the plurality of BWPs without causing data interruption regarding data transmission or reception by apparatus 210. In such cases, the power profile may include a set of one or more selections and one or more restrictions on BWP parameters.

In some implementations, in changing the aspect of the power profile, process 400 may involve processor 212 changing a value of a selection or a restriction of the set of one or more selections and one or more restrictions. In such cases, the set of one or more selections and one or more restrictions may include a search space selection, a PDCCH monitoring period selection, a restriction on a respective value of at least one of K0, K2, and aperiodic CSI-RS triggering offset.

In some implementations, apparatus 210 may be scheduled to receive or transmit data with a restriction based on a currently active minimum applicable value of either or both of the K0 and the K2. In such cases, in changing the aspect of the power profile, process 400 may involve processor 212 causing a change, for an active DL BWP or an active UL BWP, a respective minimum applicable value of either or both of the K0 and the K2 before the change is in effect in a subsequent slot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus implemented in a user equipment (UE), from a wireless network a control signaling, the control signaling comprising an indication to change a minimum applicable value of either or both of a downlink (DL) scheduling offset (K0) regarding a DL bandwidth part (BWP) and an uplink (UL) scheduling offset (K2) regarding an UL BWP; and changing, by the processor according to the indication in the control signaling, an aspect of a power profile of at least one bandwidth part (BWP) of a plurality of BWPs, the minimum applicable value of either or both of the K0 for the DL BWP and the K2 for the UL BWP, wherein the indication is carried in one or more additional bits added to an existing UE-specific scheduling downlink control information (DCI) that schedules a physical downlink shared channel (PDSCH) or a physical uplink shared channel (PUSCH).

2. The method of claim 1, wherein the power profile comprises a set of one or more selections and one or more restrictions on BWP parameters, and wherein the changing of the aspect of the power profile comprises changing a value of a selection or a restriction of the set of one or more selections and one or more restrictions.

3. The method of claim 2, wherein the set of one or more selections and one or more restrictions comprises a search space selection, a physical downlink control channel (PDCCH) monitoring period selection, a restriction on a respective value of at least one of the K0, the K2, and an aperiodic channel state information reference signal (CSI-RS) triggering offset.

4. The method of claim 1, further comprising:
receiving, by the processor, from the wireless network an indication; and
adapting, by the processor according to the indication, a new minimum applicable value of at least one of the K0, the K2, and an aperiodic channel state information reference signal (CSI-RS) triggering offset for an active DL BWP or an active UL BWP of the plurality of BWPs during a discontinuous reception (DRX) on-duration.

5. The method of claim 4, wherein the receiving of the indication comprises receiving a Layer 1 (L1)-based signaling comprising the DCI.

6. The method of claim 5, wherein the adapting according to the indication comprises adapting, according to the additional bit in the DCI, an index corresponding to the new minimum applicable value of at least one of the K0, the K2, and the aperiodic CSI-RS triggering offset for both the active DL BWP and the active UL BWP of the plurality of BWPs.

7. The method of claim 4, further comprising:
receiving, by the processor, data on the PDSCH with the new minimum applicable value of at least one of the K0, the K2, and the aperiodic CSI-RS triggering offset in effect in a second slot,
wherein the indication is received in a first slot which is ahead of the second slot in time by at least a predetermined number of slots.

8. The method of claim 7, wherein the predetermined number of slots is determined based on a sub-carrier spacing (SCS) value.

9. A method, comprising:
receiving, by a processor of an apparatus implemented in a user equipment (UE), from a wireless network an indication that indicates to change a new minimum applicable value of at least one of a downlink (DL) scheduling offset (K0) regarding a DL bandwidth part (BWP), an uplink (UL) scheduling offset (K2) regarding an UL BWP, and an aperiodic channel state information reference signal (CSI-RS) triggering offset regarding an active DL BWP or an active UL BWP of a plurality of BWPs during a discontinuous reception (DRX) on-duration; and
adapting, by the processor according to the indication, the new minimum applicable value,
wherein the indication is carried in one or more additional bits added to an existing UE-specific scheduling downlink control information (DCI) that schedules a physical downlink shared channel (PDSCH) or a physical uplink shared channel (PUSCH).

10. The method of claim 9, further comprising:
receiving, by the processor, data on the PDSCH with the new minimum applicable value of at least one of the K0, the K2, and the aperiodic CSI-RS triggering offset in effect in a second slot,
wherein the indication is received in a first slot which is ahead of the second slot in time by at least a predetermined number of slots.

11. The method of claim 10, wherein the predetermined number of slots is determined based on a sub-carrier spacing (SCS) value.

12. The method of claim 9, further comprising:
receiving, by the processor, from the wireless network a control signaling; and
changing, by the processor according to the control signaling, an aspect of a power profile of at least one BWP of the plurality of BWPs without causing data interruption regarding data transmission or reception by the UE,
wherein the power profile comprises a set of one or more selections and one or more restrictions on BWP parameters.

13. The method of claim 12, wherein the changing of the aspect of the power profile comprises changing a value of a selection or a restriction of the set of one or more selections and one or more restrictions, and wherein the set of one or more selections and one or more restrictions comprises a search space selection, a physical downlink control channel (PDCCH) monitoring period selection, a restriction on a respective value of at least one of the K0, the K2, and the aperiodic CSI-RS triggering offset.

14. The method of claim 12, wherein the UE is scheduled to receive or transmit data with a restriction based on a currently active minimum applicable value of either or both of the K0 and the K2, and wherein the changing of the aspect of the power profile comprises causing a change, for the active DL BWP or the active UL BWP, a respective minimum applicable value of either or both of the K0 and the K2 before the change is in effect in a subsequent slot.

* * * * *